(12) United States Patent
Jennings et al.

(10) Patent No.: US 8,155,014 B2
(45) Date of Patent: Apr. 10, 2012

(54) METHOD AND SYSTEM USING QUALITY OF SERVICE INFORMATION FOR INFLUENCING A USER'S PRESENCE STATE

(75) Inventors: Cullen F. Jennings, San Jose, CA (US); Cary W. FitzGerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 11/089,743

(22) Filed: Mar. 25, 2005

(65) Prior Publication Data

US 2006/0215633 A1    Sep. 28, 2006

(51) Int. Cl.
H04L 12/26    (2006.01)

(52) U.S. Cl. ........................................ 370/252; 709/227

(58) Field of Classification Search .................. None
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,134,610 A | 7/1992 | Shand et al. | 370/60 |
| 5,526,416 A | 6/1996 | Dezonno et al. | 379/265 |
| 5,649,105 A | 7/1997 | Aldred et al. | 395/200.04 |
| 5,724,420 A | 3/1998 | Torgrim | 379/372 |
| 5,742,905 A | 4/1998 | Pepe et al. | 455/461 |
| 5,940,591 A | 8/1999 | Boyle et al. | |
| 5,991,645 A | 11/1999 | Yuen et al. | 455/568 |
| 6,295,354 B1 | 9/2001 | Dezonno | 379/266 |
| 6,301,339 B1 | 10/2001 | Staples et al. | |
| 6,353,886 B1 | 3/2002 | Howard et al. | 713/156 |
| 6,463,471 B1 | 10/2002 | Dreke et al. | |
| 6,501,750 B1 | 12/2002 | Shaffer et al. | 370/352 |
| 6,510,162 B1 | 1/2003 | Fijolek et al. | 370/432 |
| 6,546,087 B2 | 4/2003 | Shaffer et al. | 379/90.01 |
| 6,546,097 B1 | 4/2003 | Peltz | 379/265.07 |
| 6,567,505 B1 | 5/2003 | Omori et al. | 379/84 |
| 6,697,462 B2 | 2/2004 | Raymond | |
| 6,748,543 B1 | 6/2004 | Vilhuber | 713/201 |
| 6,751,463 B1 | 6/2004 | Lorello et al. | 455/466 |
| 6,754,712 B1 | 6/2004 | Valencia | 709/227 |
| 6,757,722 B2 | 6/2004 | Lonnfors et al. | 709/220 |
| 6,760,322 B1 | 7/2004 | Fukuda et al. | 370/352 |
| 6,766,165 B2 | 7/2004 | Sharma et al. | 455/423 |
| 6,785,266 B2 | 8/2004 | Swartz | 370/352 |
| 6,788,779 B2 | 9/2004 | Ostapchuck | 379/265.02 |
| 6,807,423 B1 | 10/2004 | Armstrong et al. | 455/440 |
| 6,853,634 B1 | 2/2005 | Davies et al. | 370/349 |
| 6,928,473 B1 * | 8/2005 | Sundaram et al. | 709/224 |
| 6,930,983 B2 * | 8/2005 | Perkins et al. | 370/252 |

(Continued)

OTHER PUBLICATIONS

S. Blake et al., "An Architecture for Differentiated Services," RFC 2475, The Internet Society, 36 pages, 1998.

(Continued)

Primary Examiner — Brian Roberts
(74) Attorney, Agent, or Firm — Baker Botts L.L.P.

(57) ABSTRACT

In accordance with a particular embodiment of the present invention, a method using Quality of Service (QoS) information to influence a user's presence state is provided that includes the establishment of a virtual communication session between a first network device and a second network device. The virtual communication session emulates a communication session that may be established in the future. At least one QoS parameter associated with the virtual connection is monitored. Presence information is then provided to a first user that includes the QoS parameter.

23 Claims, 2 Drawing Sheets

U.S. PATENT DOCUMENTS

| | | | |
|---|---|---|---|
| 6,959,184 B1 | 10/2005 | Byers et al. | |
| 7,010,292 B2 | 3/2006 | Jerbi et al. | 455/414.1 |
| 7,039,713 B1 | 5/2006 | Van Gunter et al. | 709/229 |
| 7,042,988 B2 | 5/2006 | Juitt et al. | 379/88.17 |
| 7,043,643 B1 | 5/2006 | Doe et al. | 713/189 |
| 7,043,753 B2 | 5/2006 | Roddy et al. | 726/11 |
| 7,058,387 B2 * | 6/2006 | Kumar et al. | 455/406 |
| 7,062,563 B1 | 6/2006 | Lewis et al. | |
| 7,120,662 B2 * | 10/2006 | Vange et al. | 709/203 |
| 7,149,801 B2 | 12/2006 | Burrows et al. | |
| 7,242,421 B2 * | 7/2007 | Center et al. | 348/14.1 |
| 7,260,632 B2 | 8/2007 | Shaffer et al. | |
| 7,379,461 B2 * | 5/2008 | Wu et al. | 370/395.2 |
| 7,418,736 B2 | 8/2008 | Ghanea-Hercock | |
| 2001/0042202 A1 | 11/2001 | Horvath et al. | |
| 2002/0019853 A1 | 2/2002 | Vange et al. | 709/207 |
| 2002/0024947 A1 | 2/2002 | Luzzatti et al. | |
| 2002/0112073 A1 * | 8/2002 | MeLampy et al. | 709/240 |
| 2002/0150041 A1 * | 10/2002 | Reinshmidt et al. | 370/216 |
| 2002/0172365 A1 | 11/2002 | Nakagomi et al. | |
| 2002/0181394 A1 * | 12/2002 | Partain et al. | 370/229 |
| 2003/0107991 A1 * | 6/2003 | Tezuka et al. | 370/229 |
| 2003/0225549 A1 * | 12/2003 | Shay et al. | 702/182 |
| 2004/0034793 A1 | 2/2004 | Yuan | |
| 2004/0071084 A1 * | 4/2004 | El-Hennawey et al. | 370/230 |
| 2004/0073690 A1 * | 4/2004 | Hepworth et al. | 709/230 |
| 2004/0249910 A1 * | 12/2004 | Jerbi et al. | 709/222 |
| 2005/0022180 A1 * | 1/2005 | Couturier | 717/173 |
| 2005/0066033 A1 | 3/2005 | Cheston | |
| 2005/0083912 A1 | 4/2005 | Afshar et al. | |
| 2005/0086495 A1 | 4/2005 | Sheth et al. | 713/182 |
| 2005/0188194 A1 | 8/2005 | Fascenda | |
| 2005/0210148 A1 | 9/2005 | Kato et al. | |
| 2005/0228895 A1 | 10/2005 | Karunamurthy et al. | |
| 2005/0232184 A1 * | 10/2005 | Borella | 370/328 |
| 2005/0262195 A1 | 11/2005 | Ono et al. | 709/203 |
| 2005/0283837 A1 | 12/2005 | Olivier et al. | 726/24 |
| 2006/0041936 A1 | 2/2006 | Anderson et al. | |
| 2006/0047782 A1 | 3/2006 | Niemi | 709/220 |
| 2006/0070003 A1 | 3/2006 | Thompson et al. | 715/758 |
| 2006/0095560 A1 | 5/2006 | Wu et al. | 709/224 |
| 2006/0165064 A1 * | 7/2006 | Brown et al. | 370/352 |
| 2006/0167991 A1 | 7/2006 | Heikes et al. | |

OTHER PUBLICATIONS

E. Crawley et al., "RFC 2386—A Framework for QoS-based Routing in the Internet," RFC 2386, The Internet Society, 31 pages, 1998.

M Day et al., "A Model for Presence and Instant Messaging," RFC 2778, The Internet Society, 17 pages, 2000.

RealVNC, *About RealVNC*, RealVNC Ltd., 3 pages, 2002-2004.

Nortel Networks, *Eliminating Boundaries*, www.nortelnetworks.com, pp. 1-10, 2004.

www.webopedia.com, *firewall* definition, 2 pages, Aug. 26, 2004.

www.webopedia.com, *virtual network computing* definition, 2 pages, Jan. 21, 2005.

Patent Pending U.S. Appl. No. 11/092,782, entitled *Method and System Indicating a Level of Security for VOIP Calls Through Presence*, by Cary W. Fitzgerald et al., pp. 1-37 plus 2 pages of drawings, filed Mar. 28, 2005.

Patent Pending U.S. Appl. No. 11/129,949, entitled *Method and System Using Presence Information to Manage Network Access*, by Cullen F. Jennings et al., pp. 1-28 plus 2 pages of drawings, filed May 16, 2005.

Patent Pending U.S. Appl. No. 11/130,439, entitled *Method and System Using Shared Configuration Information to Manage Network Access for Network Users*, by Cullen F. Jennings et al., pp. 1-40 plus 2 pages of drawings, filed May 16, 2005.

Patent Pending U.S. Appl. No. 11/129,970, entitled *Method and System to Protect the Privacy of Presence Information for Network Users*, by Cullen F. Jennings et al., pp. 1-35 plus 3 pages of drawings, filed May 16, 2005.

PCT Search Report for International Application No. PCT/US06/17331, 9 pages, Sep. 6, 2006.

USPTO; *Office Action* for U.S. Appl. No. 11/129,949, filed May 16, 2005 in the name of Cullen F. Jennings; 13 pages, Mar. 25, 2009.

Richardson et al., "Virtual Network Computing," IEEE Internet Computing, vol. 2, No. 1, title page plus pp. 33-38, Jan./Feb. 1998.

USPTO Office Action, for U.S. Appl. No. 11/129,949, Jennings, Nov. 21, 2008.

USPTO Office Action, for U.S. Appl. No. 11/092,782, Fitzgerald, Nov. 28, 2008.

USPTO; *Office Action* for U.S. Appl. No. 11/130,439, Cullen F. Jennings; Notification Date Apr. 6, 2009, 13 pages.

USPTO; *Office Action* for U.S. Appl. No. 11/130,439, Cullen F. Jennings; Notification Date May 13, 2009, 3 pages.

USPTO; *Office Action* for U.S. Appl. No. 11/092,782, Cary W. Fitzgerald; Notification Date May 18, 2009, 12 pages.

USPTO; *Office Action* for U.S. Appl. No. 11/129,949, Cullen F. Jennings, Notification Date Sep. 4, 2009, 14 pages.

USPTO; *Office Action* for U.S. Appl. No. 11/129,970 Cullen F. Jennings, Notification Date Sep. 16, 2009, 10 pages.

USPTO; *Office Action* for U.S. Appl. No. 11/092,782, filed Mar. 28, 2005 in the name of Cary W. FitzGerald; 11 pages, Oct. 19, 2009.

USPTO; *Office Action* for U.S. Appl. No. 11/130,439, filed May 16, 2005 in the name of Cullen F. Jennings; 12 pages, Nov. 18, 2009.

State Intellectual Property Office of the People's Republic of China, The First Office Action, Filing No. 200680010477.1, 9 pages, Jan. 8, 2010.

USPTO Office Action, U.S. Appl. No. 11/129,949, filed May 16, 2005, inventor Cullen F. Jennings, 16 pages, Feb. 24, 2010.

U.S. Patent and Trademark Office Official Action in U.S. Appl. No. 11/092,782 dated Nov. 12, 2010, 16 pages.

U.S. Patent and Trademark Office Official Action in U.S. Appl. No. 11/129,949, dated Aug. 27, 2010, 16 pages.

U.S. Patent and Trademark Office Final Official Action in U.S. Appl. No. 11/129,949, dated Feb. 11, 2011, 14 pages.

\* cited by examiner

METHOD AND SYSTEM USING QUALITY OF SERVICE INFORMATION FOR INFLUENCING A USER'S PRESENCE STATE

TECHNICAL FIELD OF THE INVENTION

This invention relates in general to communication systems and, more particularly, to a method and system using Quality of Service information for influencing a user's presence state.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, where a user is associated with multiple endpoints, it can be anticipated that one endpoint may be more amenable to the establishment of a communication session than others. For example, the quality of service that may be established over one endpoint may be better than that available over other endpoints. In addition, some endpoints, such as Videophones, may have different quality of service requirements than other endpoints, such as instant messaging clients. Current communication systems do not provide a user with valuable quality of service information for the establishment of communication sessions. This deficiency presents an obstacle for any employee, employer, individual, or endpoint that seeks to execute successful and productive communication sessions.

SUMMARY OF THE INVENTION

The present invention provides a method and system for the selective establishment of a communication session that substantially eliminates or reduces at least some of the disadvantages and problems associated with previous methods and systems.

In accordance with a particular embodiment of the present invention, a method using Quality of Service (QoS) information to influence a user's presence state is provided that includes the establishment of a virtual communication session between a first network device and a second network device. The virtual communication session emulates a communication session that may be established in the future. At least one QoS parameter associated with the virtual connection is monitored. Presence information is then provided to a first user that includes the QoS parameter.

Certain embodiments of the present invention may provide a number of technical advantages. For example, according to one embodiment of the present invention, an architecture and a process are provided that allow for the continuous monitoring of QoS information associated with a plurality of endpoints. A further technical advantage may be the displaying of presence information that includes the QoS information to an end user. As a result, the initiator of a communication session may make meaningful decisions about the efficiency or practicability of establishing a communication session with another end user. As a further advantage, because presence information is made available to the initiator of the communication session, the initiator may make such decisions prior to the initiation of the communication session.

Moreover, as a result of the continuous monitoring of QoS information, higher quality communication sessions may be established between two end users. As a result, a higher number of successful calls may be completed, which vastly improves efficiency parameters (particularly in the workplace). Additionally, endpoints that are not able to achieve a desired QoS may be shown as "not present" to identify the endpoints as unable to establish meaningful communication sessions.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
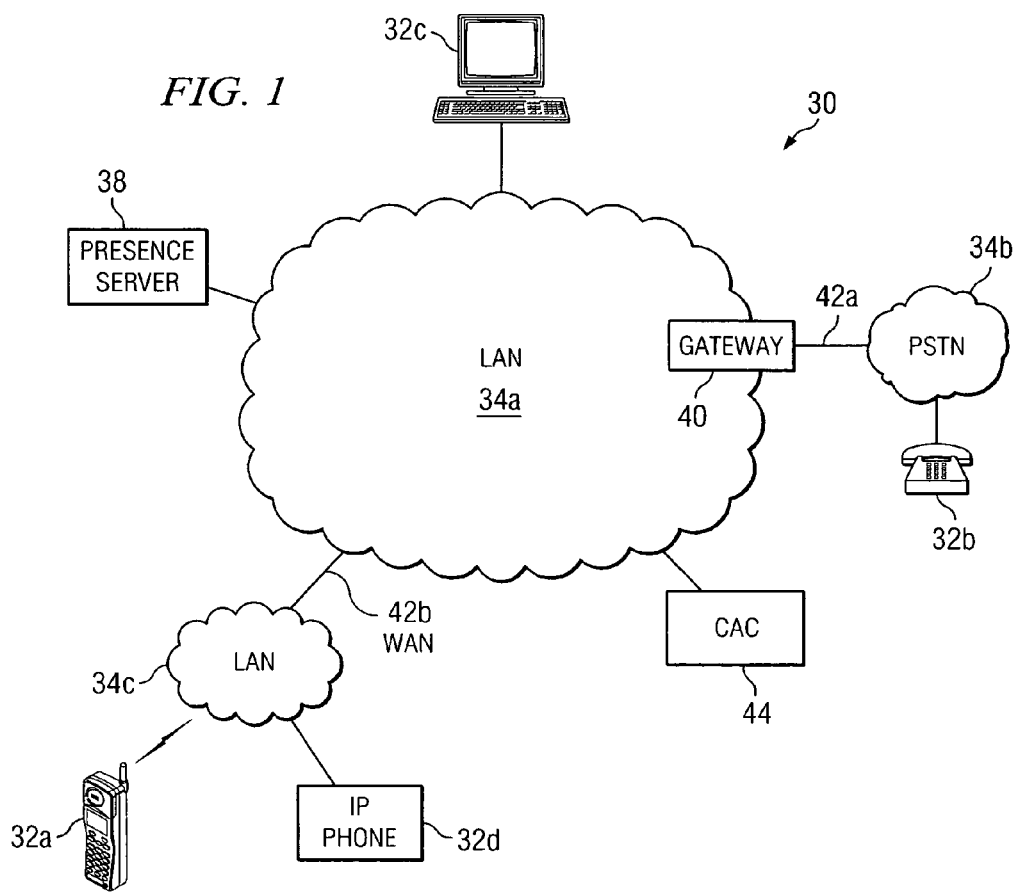
FIG. 1 illustrates a communication system using Quality of Service information to influence a user's presence state in accordance with a particular embodiment of the present invention.

FIG. 1 illustrates a communication system 30 for providing Quality of Service (QoS) information in conjunction with presence information in accordance with a particular embodiment of the present invention. System 30 includes a plurality of endpoints 32a-32d having the ability to establish communication sessions between each other, using one or more of communication networks 34a-34c. In particular embodiments, system 30 also includes a presence server 38 that operates to manage presence information for the plurality of endpoints 32a-32c. For example purposes, assume endpoint 32a is associated with a first user and that endpoints 32b-32c are associated with a second user. Thus, the first user may use endpoint 32a to establish a communication session with the second user. Whether the communication session is established between endpoint 32a and endpoint 32b or endpoint 32a and endpoint 32c is determined by the availability of the second user and, to some degree, the discretion of the first user due to the availability of presence information. In particular embodiments, the first user may select which endpoint 32b or 32c to reach the second user based on the QoS information available with respect to each endpoint 32b and 32c.

It will be recognized by those of ordinary skill in the art that endpoints 32a-32d, presence server 38, and/or gateway 40 may be any combination of hardware, software, and/or encoded logic that provides communication services to a user. For example, each endpoint 32a-32d may include a telephone, a computer running telephony software, a video monitor, a camera, an IP phone, a cell phone or any other communication hardware, software, and/or encoded logic that supports the communication of packets of media (or frames)

using communication networks 34a-34c. Endpoints 32a-32d may also include unattended or automated systems, gateways, other intermediate components, or other devices that can establish media sessions. Although FIG. 1 illustrates a particular number and configuration of endpoints, presence servers, segments, nodes, and gateways, communication system 30 contemplates any number or arrangement of such components for communicating media. Furthermore, the endpoints 32 of system 30 may be associated with any number of users.

As illustrated, system 30 includes three communication networks 34a-34c. The term "communication network" should be interpreted as generally defining any network capable of transmitting audio and/or video telecommunication signals, data, and/or messages, including signals, data or messages transmitted through text chat, instant messaging and e-mail. Generally, communication networks 34a-34c provide for the communication of packets, cells, frames, or other portions of information (generally referred to as packets herein) between endpoints 32a-32d. Communication links 42a and 42b couple communication networks 34a and 34b, and communication networks 34a and 34c, respectively. Accordingly, users of endpoints 32a-32d can establish communication sessions between and among each network component coupled for communication with one or more of networks 34a-34c. A call admission control (CAC) system 44 may be used to monitor the amount of bandwidth available over communication networks 34a-34c.

In the illustrated embodiment, communication network 34a is a local area network (LAN) that enables communication between a plurality of endpoints 32a-32d distributed across multiple cities and geographic regions. Communication network 34b is a public switched telephone network (PSTN) and couples endpoint 32a with communication network 34a through gateway 40. Communication network 34c is another LAN, which couples endpoints 32a and 32d with communication network 34a. Communication link 42b is a wide area network (WAN), which couples LANs 34a and 34c. However, the described communication networks 34a-34c are merely provided as an example configuration of communication networks. It is recognized that any one of networks 34a-34c may be implemented as a local area network (LAN), wide area network (WAN), global distributed network such as the Internet, Intranet, Extranet, or any other form of wireless or wireline communication network.

In a particular embodiment, communication network 34a employs voice communication protocols that allow for the addressing or identification of endpoints and other network devices coupled to communication network 34a. For example, using Internet protocol (IP), each of the components coupled together by communication network 34a in communication system 30 may be identified in information directed using IP addresses. In this manner, network 34a may support any form and/or combination of point-to-point, multicast, unicast, or other techniques for exchanging media packets among components in communication system 30. Any network components capable of exchanging audio, video, or other data using frames or packets, are included within the scope of the present invention.

Network 34a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 34a may also be coupled to non-IP telecommunication networks through the use of interfaces or components, for example gateway 40. In the illustrated embodiment, communication network 34a is coupled with PSTN 34b through gateway 40. PSTN 34b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 34b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d and gateway 38 are IP telephony devices. IP telephony devices have the ability of encapsulating a user's voice (or other input) into IP packets so that the voice can be transmitted over network 34a. IP telephony devices may include telephones, fax machines, computers running telephony software, nodes, gateways, or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

In particular embodiments, users of endpoints 32a-32d may be identified by components of system 30 according to a uniform reference identifier (URI), such as a user's email address, or other suitable identifier so that a user may be located, monitored, and/or contacted through presence detection technology. Presence detection technology allows end users to maintain a single externally visible identifier regardless of their network location. For example, SIP features enable endpoints 32a-32d to discover one another and to agree on a characterization of a session they would like to share. For locating prospective session participants, and for other functions, SIP enables the creation of an infrastructure of network hosts, such as presence server 38, to which users of endpoints 32a-32d can send registrations, invitations to sessions, and other requests.

Components of system 30 may capture information about various communication devices, or endpoints, available to a user and their status, such as whether a cellular phone is switched on or whether a user is logged into a personal computer (PC). Specifically, the SIP technology allows users of endpoints 32a-32d to query for the presence of a particular user of an end point 32. This would provide a presence availability status for the end user, as well as location information, device information, and any personal presence status that an end user wishes to communicate to other end users. Hence, communication system 30 builds on existing SIP capabilities and, further, extends them to provide enhanced information to a calling party. This may be achieved using a VoIP platform. The versatility of the presence detection technology, however, enables it to be used in both IP components, such as IP phone 32d, and other non-IP components, such as components of PSTN 34b.

In particular embodiments, SIP may also include primitives supporting session setup capabilities. In an example scenario, a first end user of endpoint 32a may desire to establish a communication session with a second end user. As described above, the second end user may be associated with endpoint 32b and endpoint 32c. In accordance with the teachings of the present invention, communication system 30 offers an interface on endpoint 32a that may be displayed to the first end user to facilitate the establishment of an optimum call session between the respective parties. Specifically, the interface may display presence information for the second end user. The presence information may identify the endpoints 32b or 32c through which the second user is available as well as the QoS associated with the respective endpoints 32b and 32c. Thus, the architecture of communication system 30 allows the first end user of endpoint 32a to make a proactive or real time decision about the establishment of a communication session before the communication session is initiated from endpoint 32a.

The QoS information provided to the first end user of endpoint 32a may include measures of the quality of service available on endpoints 32b and 32c. While QoS is difficult to define in any context, QoS may include performance parameters associated with a communication session. The QoS of digital circuits, such as endpoints utilizing ATM or VoIP, may include specific error conditions that are assigned and compared. The performance parameters considered in determining QoS for an ATM communication session include cell error ratio (CER), severally errored cell block ratio (SECBR), cell loss ratio (CLR), cell misinsertion rate (CMR), cell transfer delay (CTD), mean cell transfer delay (MCTD) and cell delay variability (CDV). Unfortunately, IP, with a connectionless, "best effort" delivery model, does not guarantee delivery of packets in order, in a timely manner, or at all. In order to obtain an acceptable level of quality, certain bandwidth, latency, and jitter (delay variation), and packet loss requirements must be met that allows multimedia IP traffic to coexist with traditional data traffic on the same network.

For providing QoS information to an end user, presence server 38 or another network device may include appropriate software, hardware, and/or encoded logic for measuring QoS information for any number of endpoints 32 in system 30. Because the QoS information is made available to an end user of endpoints 32a-32d before a communication session is established, however, presence server 38 may be said to measure QoS for a virtual communication session. The virtual communication session emulates an actual communication session that might be established between two endpoints should the end users of the respective endpoints elect to do so.

In particular embodiments, the virtual communication session may be established between two endpoints 32. Thus, this type of virtual session may be referred to as an end-to-end virtual session. Returning to the example scenario described above, where first end user at endpoint 32a desires to establish a voice communication session with a second end user associated with endpoint 32b, which comprises a telephone, and endpoint 32c, which comprises a computing device, a virtual communication session may be established between the respective endpoints. Thus, a first virtual communication session may be established between endpoint 32a and endpoint 32b, and a second virtual communication session may be established between endpoint 32a and endpoint 32c. Each of the virtual communication sessions may include the transmission of test packets of a similar type media. Accordingly, where a voice communication session is desired, voice packets may be transmitted between the respective endpoints. The Qos of each of the virtual communication sessions may then be measured and the information incorporated into the presence information managed by presence server 38.

In other embodiments, a single virtual communication session may be established to represent the virtual sessions between an endpoint and multiple other endpoints. This type of virtual session may be referred to as segmented virtual session. A segmented virtual session may be more practical than an end-to-end virtual session where real time or near real time QoS information is desired for a number of endpoints or combinations of endpoints. To avoid the establishment of many similar virtual communication sessions, a virtual communication session may be established between an endpoint and a centralized presence server or other centralized agent. For example, if first end user at endpoint 32a desires to establish a voice communication session with endpoint 32b and/or endpoint 32c, a virtual communication session may be established between endpoint 32a and a presence server or other agent associated with endpoints 32b and 32c. The segmented approach to virtual session processing assumes that if that the QoS between endpoint 32a and the presence server or other agent for endpoints 32b and 32c is good, the QoS between the respective endpoints will also be good.

After QoS information is gathered for the endpoints 32 (using either an end to end or segmented approach), the QoS information is stored in presence server 38. The first end user of endpoint 32a may access presence information for the second end user and the associated endpoints 32b and 32c prior to the establishment of the voice communication session. Depending upon the particular embodiment implemented, the presence information may be displayed to the first end user over a display associated with endpoint 32a, a computer, or another network device. The presence information displayed to the first end user may indicate that the second end user is available to take a call on endpoint 32b or to receive an instant message or email message on endpoint 32c. The first end user may then use this information to determine the endpoint 32b or endpoint 32c with which first end user should seek to initiate a communication session.

In particular embodiments, DiffServe markings may be used in the transmission of test packets to obtain a better estimate of the QoS of a virtual communication session. DiffServe markings help to differentiate between multiple traffic flows. Specifically, the test packets are "marked" in a manner that enables routers and switches to make decisions based on those markings. The markings alter bits (for example, bits in the type of service (ToS) byte) within a frame, cell, or packet to indicate how the network should treat that traffic. In particular embodiments, the DiffServe markings may include IP Precedence or Differentiated Service Code Point (DSCP) markings. Although the markings alone do not change how network 30 treats the test packets, other tools, such as queuing tools, may reference the markings and make decisions based on them. For example, the markings may be used to make dropping or forwarding decisions. Because DiffServe does not make an explicit reservation for the future communication session, however, it may be called "Soft QoS."

Other methods may also be used by presence server 38 to measure the QoS of the virtual communication session. For example, a reservation may be formed using IntSrv. IntSrv (also known as Integrated QoS and Inteservices) is used to make bandwidth reservations for a future communication session. In particular embodiments, presence server 38 uses IntSrv signaling among endpoints 32a-32d to provide bandwidth reservations. Resource Reservation Protocol (RSVP) is an example of an IntSrv approach to QoS. Where presence server 38 implements IntSrv to make strict bandwidth reservations, presence server 38 may be said to provide "Hard QoS." information.

In still other embodiments, presence server 38 may obtain information from CAC system 44 to provide QoS information for endpoints 32*a*-32*d*. As described above, CAC system 44 monitors the amount of bandwidth available over WAN 42*b*. Generally, CAC system 44 counts communication sessions in progress on a network in system 30 and determines whether the networks can handle any additional communication sessions. Presence server 38 may translate the information provided by CAC system 44 to provide QoS information for an endpoint 32.

The QoS information gathered by presence server 38 using any of the above or other known techniques may be provided to end users for the selective establishment of communication sessions. Stated differently, an end user who desires to initiate a communication session with another end user may access presence information and QoS information to determine the endpoints that can communicate the most effectively. Thus, in particular embodiments, the QoS information may rate or otherwise qualify the prospective communication sessions between two endpoints. In other embodiments, if the QoS over a virtual communication session is identified as being too poor for the establishment of an effective communication session, the QoS information may identify one or both of the respective endpoints as unavailable. For example, if gateway 40 has failed, trunk lines are down, or another component of PSTN network 34*b* has failed, endpoint 32*b* may be identified to other end users as unavailable.

Figure 2:
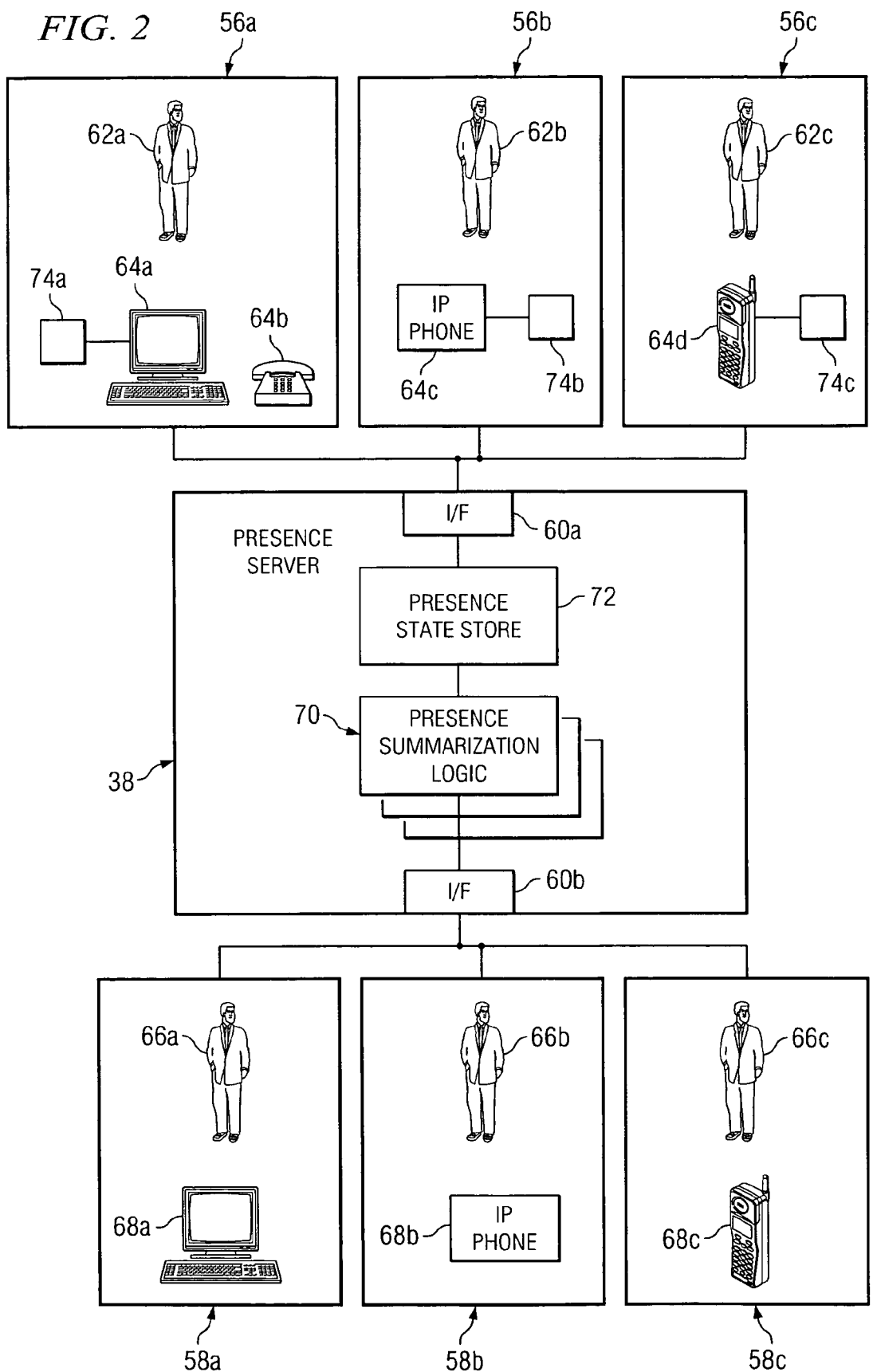
FIG. 2 illustrates a presence server of FIG. 1 in more detail, illustrating aspects of the present invention.

FIG. 2 illustrates presence server 38 in more detail, in accordance with a particular embodiment of the present invention. Examples of presence servers include presence servers as defined by Internet Society, such as in RFC2778. Specifically, presence server 38 is coupled to one or more presentities 56 and one or more presence watchers 58 through communication networks 34*a*-34*c*. Interfaces 60 allow presence server 38 to obtain information from presentities 56 and provide information to presence watchers 58. As will be described in more detail below, presentities 56*a*-56 include end users 62*a*-62*c* (and associated endpoints 64*a*-64*d*) who provide presence information to presence server 38 for distribution to other end users. Conversely, presence watchers 58*a*-58*c* include an end users 66*a*-66*c* (and associated endpoints 68*a*-68*c*) that receive presence information about other end users from presence server 38. Although presentities 56 and presence watchers 58 are illustrated as being exclusive from one another, it is generally recognized that an end user and its associated endpoints may both provide information to and receive information from presence server 38. Accordingly, any end user of presence server 38 may be both a presentity and a presence watcher.

Continuing the example scenario from above, an end user, such as first end user 62*a*, provides presence information to presence server 38 through interface 60*a*. When a presence watcher end user, such as second end user 66*a*, desires to reach first end user 62*a*, presence server 38 is used to provide presence information to second end user 66*a*. The presence information may be used by second end user 66*a*, as a presence watcher, to determine the availability of first end user 62*a* at endpoints 64*a* and 64*b*, respectively.

Processor 70, which is illustrated as presence summarization logic 70, may include any combination of hardware (microprocessors, controllers, or other suitable computing devices or resources), software, and/or encoded logic that may be used to monitor the presence of an end user at an endpoint. In particular embodiments, presence server 68 comprises a single computer or a group of computers that are capable of receiving presence information regarding one or more presentities, such as first end user 62*a*, and selectively provide that information to one or more presence watchers, such as second end user 66*a*. In particular embodiments, processor 70 cooperates with a memory module 72, illustrated as presence state store 72, to provide presence information and QoS information to presence watchers 58*a*-58*c*, such as second end user 66*a*.

Generally, processor 70 may detect the presence of end users 62*a*-*c* at endpoints 64*a*-64*c*. For example, processor 70 may receive presence information from one or more of presence clients 74*a*-74*c* at the end user's endpoint 64*a*-64*c*, for example, at the end user's PC, phone, personal digital assistant (PDA) or any other presence client device (e.g., presence clients 74*a*-72*c*). In particular embodiments, for example, presence clients 74 include software or hardware embodied in a telecommunications switch that determines the hook status of a telephone or other device. In other embodiments, presence clients 74 include software that monitor whether an endpoint comprising a computer is logged into. In still other embodiments, presence clients 74 comprise a device that communicates with an ID tag worn by an end user 62 to indicate the location of end user 62. However, although particular presence clients 74 are described, a variety of presence clients 74 may be utilized according to the teachings of the invention to provide presence information regarding the availability, location, or activity in which an end user 62 is engaged.

In particular embodiments, the presence information obtained about an end user 62 includes the "state" of that end user 62. End users 62 may be placed in various states, such as a "ready" state, a "not ready" state, and a "talking" state, according to the current status of the endpoint 64 with respect to presence server 38. For example, an end user 62 in a ready state may be ready and able to accept an incoming call. Accordingly, such an end user 62 may be said to be "available." Conversely, an end user 62 in a not ready state may be away from his desk or otherwise not ready to accept an incoming call, and an end user 62 in a talking state may currently be communicating on an incoming or outgoing call. In either case, the end user 62 may be said to be "unavailable."

To provide presence information to presence watchers, such as end users 68*a*-68*c*, processor 70 may access data in memory module 72. Memory module 72 may be any form of volatile or non-volatile memory including, without limitation, magnetic media, optical media, random access memory (RAM), read-only memory (ROM), removable media, or any other suitable local or remote memory component.

In particular embodiments, memory module 72 includes a list for some or all of end users 62*a*-*c* and 66*a*-66*c*. The lists may include subscription lists, buddy lists, or other association information. For example, rather than make presence information for every end user 62*a*-62*c* and 68*b*-68*c* within system 30 available to second end user 66*a*, first end user 62*a*, as a presentity, may subscribe to a presence service. Accordingly, the subscription may identify to whom first end user 68*a* wants his presence information made available to and to what extent such information should be available. Thus, in a particular embodiment, first end user 62*a* may exert an amount of control over his own presence information. Additionally or alternatively, second end user 66*a*, as a presence watcher, may be required to subscribe to receive presence information. Thus, the subscription lists, buddy lists, or other association information may also or alternatively identify those end users 62*a*-62*c* for which second end user 66*a* would like to receive presence information.

In the example scenario where second end user 66*a* desires to initiate a communication session with first end user 62*a*, second end user 66*a* may obtain presence information for all end users 62a-c on the subscription or buddy list of second end user 66a. Accordingly, if second end user 66a has subscribed only to receive presence information for first end user 62a, presence server 38 will only make presence information for first end user 62a available to second end user 66a. Presence information for a third end user 62b and a fourth end user 62c will not be made available to second end user 66a. Before establishing a communication session with first end user 62a, second end user 66a may reference the presence information associated with first end user 62a to determine whether second end user 66a should initiate a communication session with first end user 62a through endpoint 62a or endpoint 64b. For example, second end user 66a, as a presence watcher, may use the information to determine whether he should send first end user 62a an email to be delivered at endpoint 64a (i.e., a computer) or call first end user 62a on endpoint 62b (i.e., a telephone).

As described above, the presence information may include QoS information that indicates the quality of the communication session that can be expected if a communication session is established between any two endpoints. In the example scenario described above, the use of a subscription list or buddy list prevents presence server 38 from having to monitor QoS between all endpoints in system 30. As described above, presence server 38 establishes a virtual connection between each endpoint to provide QoS information to second end user 66a. Thus, where second end user 66a subscribes to or is otherwise entitled to receive presence information for only first end user 62a, a virtual connection must be established between all endpoints 68 associated with second end user 66a and all endpoints associated with first end user 62a. Because presence information for third and fourth end users 62b and 62c is not provided to second end user 66a, however, a virtual connection is not established between endpoint 68a (associated with second end user 66a) and endpoints associated with third and fourth end users 62b and 62c. Accordingly, the subscription list or buddy list utilized from memory module 72 prevents system 30 from being overburdened with QoS traffic transmitted over the various communication networks 34a-34c.

Although subscription lists and buddy lists are described above for associating users of system 30 with other users of system 30, it is recognized that any other mechanism for the linkage or association of users may be utilized. Other example sources of association information that may be used to provide presence information include address lists or contact lists from an email program (i.e., MicroSoft Office), information provided by social networks or reputation services, or association lists such as those used by Five Degrees of Separation, Linked In, and Orchid. It is also recognized that the such mechanisms need not be stored in memory module 72 but may be stored in any component of system 30. In particular embodiments, such mechanisms may be stored at the endpoints.

Furthermore, it will be recognized by those of ordinary skill in the art that presence server 38 is merely one example configuration of a presence server for providing presence information to end users in communication system 30. Accordingly, it is generally recognized that presence server 38 may include any number of processors, memory modules, or other components to accomplish the functionality and features described herein. Additionally, processor 70, and/or memory module 72 associated with presence server 38 may be centrally located (local) with respect to one another, or distributed throughout communication networks 34a-34c.

Figure 3:
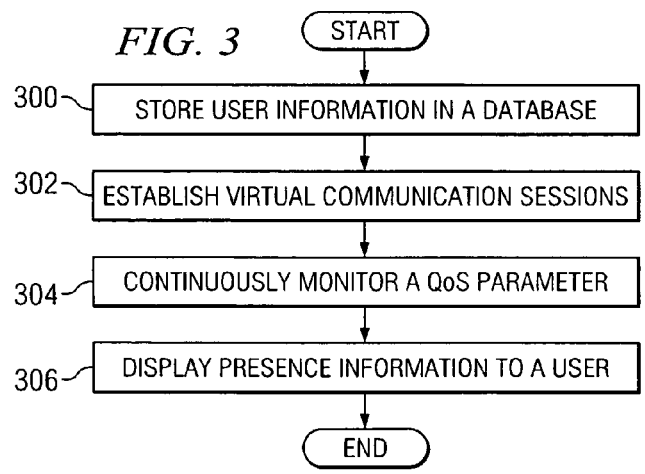
FIG. 3 illustrates an example method using Quality of Service information to influence a user's presence state, in accordance with an embodiment of the present invention.

FIG. 3 illustrates an example method for providing presence information including QoS information for a plurality of users, in accordance with an embodiment of the present invention. The method begins at step 300 with the storing of user information in a database. In particular embodiments, the user information may include subscription lists, buddy lists, address lists, contact lists, social network information, or other association information that may link a plurality of users using a network or combination of networks for communication.

At step 302, a virtual communication session is established between at least two of the plurality of end users. For example, a virtual communication session may be established between a first network device and a second network device. In particular embodiments, the first and second network devices may comprise a first endpoint 32a associated with a first end user and a second endpoint 32b associated with a second end user, respectively. Thus, the virtual communication session may be considered end-to-end. Alternatively, the first and second network devices may comprise a first endpoint associated with a first end user and a network agent device associated with a second end user, respectively. Accordingly, the virtual communication session may be considered segmented or centralized. Whether the virtual communication session is end-to-end or segmented, the communication session is considered virtual since it is established before either of the first or second end users have taken action to establish a communication session. The virtual communication session, however, emulates a communication session that may be established between the two end users in the future.

Where either or both of the first and second end users is associated with multiple endpoints 32, a virtual communication session may be established between each endpoint 32 associated with the first end user and each endpoint 32 associated with the second end user. For example, if endpoint 32a is associated with a first end user and endpoints 32b and 32c are associated with a second end user, two virtual communication sessions may be established. A first virtual communication session may be established between endpoint 32a and endpoint 32b, and a second virtual communication session may be established between endpoint 32a and endpoint 32c. In this manner, the QoS between each endpoint for all possible communication paths may be monitored.

At step 304, at least one QoS parameter associated with the virtual connections established at step 302 may be monitored. In particular embodiments, the continuous monitoring of the QoS parameter may include the transmission of a plurality of test packets along the virtual communication session. The QoS parameter may be measured for the transmission of the plurality of test packets. Where desired, the plurality of test packets may be marked to identify the type of test packets transmitted. The marking of the plurality of test packets may result in a better estimate of the QoS parameter being measured.

In other embodiments, the continuous monitoring of the QoS associated with the virtual communication session may include forming a bandwidth reservation for a communication session that may be established in the future. In particular embodiments, the reservation may be made using IntSrv RSVP. In still other embodiments, the continuous monitoring of the QoS associated with the virtual communication session may include the counting of a plurality of communication sessions already in progress on the one or more networks of interest. A determination may then be made as whether the one or more networks can handle an additional communication session between the endpoints 32.

At step 306, presence information may be displayed to a user of an endpoint 32 being monitored. The presence information may include availability information associated with any of endpoints 32 being monitored. For example, if endpoint 32a associated with the first end user comprises a cell phone, the presence information may identify whether the first user is available to take a phone call over the cell phone. The presence information also includes the QoS parameter that has been continuously monitored. In particular embodiments, the QoS parameter may include a CER, SECBR, CLR, CMR, CTD, MCTD, or a CDV.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the continuous monitoring of QoS information associated with a plurality of endpoints. As a result, the initiator of a communication session may make meaningful decisions about the efficiency or practicability of establishing a communication session with another end user. As a further advantage, because presence information is made available to the initiator of the communication session, the initiator may make such decisions prior to the initiation of the communication session.

As a result of the monitoring of QoS information, higher quality communication sessions may be established between two end users. As a result, a higher number of successful calls may be completed, which vastly improves efficiency parameters (particularly in the workplace). Additionally, endpoints that are not able to achieve a desire QoS may be shown "as not present" or otherwise unavailable to identify the endpoints as unable to establish a meaningful communication session.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method using Quality of Service (QoS) information to influence a user's presence state, comprising:
   establishing a first communication session between a first network device associated with a first user and a second network device associated with a second user, the first communication session emulating a second communication session that may be established in the future between the first network device and the second network device;
   monitoring at least one QoS parameter associated with the first communication session;
   providing presence information to the first user, the presence information indicating an endpoint associated with the second user and the at least one QoS parameter associated with the endpoint;
   receiving a user selection from the first user identifying at least one of the first communication session or the endpoint, the user selection based upon the presence information; and
   establishing the second communication session between the first network device and the endpoint in response to receiving the user selection.

2. The method of claim 1, wherein establishing the first communication session between the first network device and the second network device comprises establishing a first communication between a first endpoint associated with the first user and a second endpoint associated with the second end user.

3. The method of claim 1, wherein establishing the first communication session between the first network device and the second network device comprises establishing a virtual communication network between a first endpoint associated with the first user and a network agent device associated with the second end user.

4. The method of claim 1, wherein monitoring the at least one QoS parameter comprises:
   transmitting a plurality of test packets between a first endpoint and a second endpoint; and
   measuring the at least one QoS parameter for the transmission of the plurality of test packets.

5. The method of claim 4, further comprising:
   marking the plurality of test packets with a plurality of markings to obtain an estimate of the at least one QoS parameter associated with the first communication session, the plurality of markings identifying the type of test packets transmitted.

6. The method of claim 1, wherein monitoring the at least one QoS parameter comprises:
   forming a bandwidth reservation for the second communication session that may be established in the future.

7. The method of claim 6, further comprising using IntSrv Resource Reservation Protocol (RSVP) to form the bandwidth reservation for the second communication session that may be established in the future.

8. The method of claim 1, wherein monitoring the at least one QoS parameter comprises:
   counting a plurality of communication sessions in progress on one or more networks; and
   determining whether the one or more networks can handle an additional communication session between a first endpoint and a second endpoint.

9. The method of claim 1, wherein the at least one QoS parameter comprises at least one selected from the group consisting of cell error ratio (CER), severally errored cell block ratio (SECBR), cell loss ratio (CLR), cell misinsertion rate (CMR), cell transfer delay (CTD), mean cell transfer delay (MCTD), and cell delay variability (CDV).

10. The method of claim 1, wherein providing the presence information to the first user comprises:
    determining the availability of the second user for establishment of the second communication session between a first endpoint and a second endpoint; and
    displaying the availability of the second user to the first user at the first endpoint.

11. The method of claim 1, wherein:
    monitoring the at least one QoS parameter comprises determining that QoS between the first and second network devices is of a level that is ineffective for communication; and providing the presence information to the first user comprises identifying to the first user that the endpoint associated with the second user is unavailable.

12. A system using Quality of Service (QoS) information to influence a user's presence state, comprising:
a plurality of endpoints operable to establish one or more communication sessions over a network; and
a processor coupled to the network, the processor operable to:
establish a first communication session between a first network device associated with a first user and a second network device associated with a second user, the first communication session emulating a second communication session that may be established in the future between the first network device and the second network device;
monitor at least one QoS parameter associated with the first communication session;
provide presence information to the first user, the presence information indicating an endpoint associated with the second user and the at least one QoS parameter associated with the endpoint;
receive an indication that the first user desires to establish the second communication session with the second user, the second user associated with the endpoint;
receive a user selection from the first user identifying at least one of the first communication session or the second network device; and
establish the second communication session between the first network device and the endpoint in response to receiving the user selection.

13. The system of claim 12, wherein the processor is operable to establish the first communication session between the first network device and the second network device by establishing a first communication between a first endpoint associated with the first user and a second endpoint associated with the second user.

14. The system of claim 12, wherein the processor is operable to establish the first communication session between the first network device and the second network device by establishing a first communication network between a first endpoint associated with the first user and a network agent device associated with the second user.

15. The system of claim 12, wherein the processor is further operable to:
transmit a plurality of test packets between a first endpoint and a second endpoint; and
measure the at least one QoS parameter for the transmission of the plurality of test packets.

16. The system of claim 15, wherein the processor is further operable to:
mark the plurality of test packets with a plurality of markings to obtain an estimate of the at least one QoS parameter associated with the first communication session, the plurality of markings identifying the type of test packets transmitted.

17. The system of claim 12, wherein the processor is further operable to form a bandwidth reservation for the second communication session that may be established in the future.

18. The system of claim 17, wherein the processor is further operable to use IntSrv Resource Reservation Protocol (RSVP) to form the bandwidth reservation for the second communication session that may be established in the future.

19. The system of claim 12, wherein the processor is further operable to:
count a plurality of communication sessions in progress on one or more networks; and
determine whether the one or more networks can handle an additional communication session between a first endpoint and a second endpoint.

20. The system of claim 12, wherein the at least one QoS parameter comprises at least one selected from the group consisting of cell error ratio (CER), severally errored cell block ratio (SECBR), cell loss ratio (CLR), cell misinsertion rate (CMR), cell transfer delay (CTD), mean cell transfer delay (MCTD), and cell delay variability (CDV).

21. The system of claim 12, wherein the processor is further operable to:
determine an availability of the second user for establishment of the second communication session between a first endpoint and a second endpoint; and
display the availability of the second user to the first user at the first endpoint.

22. The system of claim 12, wherein the processor is further operable to:
determine that QoS between the first and second network devices is of a level that is ineffective for communication; and
provide the presence information to the first user by identifying to the first user that the endpoint associated with the second user is unavailable.

23. Logic embodied in a non-transitory computer readable storage medium, the logic being operable when executed to:
establish a first communication session between a first network device associated with a first user and a second network device associated with a second user, the first communication session emulating a second communication session that may be established in the future between the first network device and the second network device;
monitor at least one Quality of Service (QoS) parameter associated with the first communication session;
provide presence information to the first user, the presence information indicating an endpoint associated with the second user and the at least one QoS parameter associated with the endpoint;
receive a user selection from the first user identifying at least one of the first communication session or the endpoint, the user selection based upon the presence information; and
establish the second communication session between the first network device and the endpoint in response to receiving the user selection.

* * * * *